Patented Nov. 4, 1941

2,261,623

UNITED STATES PATENT OFFICE 2,261,623

FINGERNAIL ENAMEL

Robert T. Hucks, South River, N. J., assignor to E. I. du Pont de Nemours & Company, Wilmington, Del., a corporation of Delaware No Drawing. Application August 16, 1938, Serial No. 225,146

3 Claims. (Cl. 167—85)

This invention relates to finger nail enamel compositions and more particularly to an improved pigmented enamel for application to the finger nail.

During the past few years there has been a pronounced trend in the nail polish trade away from the older transparent colored enamels to a product which provides a more pleasing opaque appearance when applied to the finger nail. Attempts have been made to obtain this opacity by the inclusion of a white pigment in the composition. Dyes are added and mechanically mixed to produce the tinted shades. This type of finger nail enamel is frequently characterized by undesirable tendencies of the pigment settling out to form a hard cake at the bottom of the container accompanied by segregation of the dye near the surface of the liquid. These compositions are also often found to be chemically unstable, with the result that discoloration occurs causing a decrease in opacity and the formation of an undesirable brown color. This discoloration is caused by a reaction of the pigment with the dye or with certain decomposition products of the cellulose nitrate, which constitutes the major film-forming ingredient in the conventional finger nail enamels. The use of a substantially inert pigment such as titanium oxide will usually obviate any discoloration difficulties, but it does not eliminate the tendency toward segregation of color and settling of the pigment. Zinc oxide of small particle size provides satisfactory non-settling qualities but does not eliminate dye segregation at the surface of the enamel composition and, furthermore, does not prevent reaction with the cellulose nitrate and certain mechanically admixed dyes, such as rhodamine.

It is, therefore, an object of this invention to provide an opaque finger nail enamel composition of the dye-tinted, pigmented type which will remain in a substantially homogeneous state and show practically no settling of pigment or segregation of dye at the surface during storage in bottles or in other suitable containers. A further object is the provision of a dye-tinted, pigmented finger nail enamel composition, the ingredients of which remain stable with respect to color value, opacity, and durability. Other objects will become apparent as the description of the invention proceeds.

These objects are accomplished by the utilization of a lake pigment, comprising small particle size zinc oxide as the substratum, in cellulose nitrate finger nail enamel compositions as hereinafter more fully described.

In the practice of this invention, a lake pigment is prepared by chemically precipitating a suitable dye on a substratum consisting of a special zinc oxide pigment distinguished from the commonly used zinc oxide by its relatively small particle size; the diameter of the individual particles averaging about 0.15 micron and the diameters of substantially all of the individual particles coming within the range of about 0.12 to 0.18 micron. One commercial form of this zinc oxide of small particle size now on the market is known as "Kadox," a product offered for sale by the New Jersey Zinc Company.

The following examples illustrate one method of preparing the lake pigment:

EXAMPLE 1—ORANGE LAKE

|  | Grams |
|---|---|
| "Kadox" | 475 |
| Water | 2000 |
|  |  |
| Orange dye* | 52 |
| Water | 1340 |
|  |  |
| Barium chloride | 80 |
| Water | 720 |

*Orange dye: 2,chlor-4,amino-1,toluene-5,sulphonic acid coupled to 2,naphthol-3,6,disulphonic acid as described in U. S. Patent #2,117,859.

In the above example the ingredients of the first portion were thoroughly mixed in a suitable container. The dye was dissolved in the water of the second portion and added to the pigment mixture of the first portion. The mixture was agitated and brought to boil. The barium chloride solution of the third portion was added and agitation and boiling continued for 10 minutes. The resulting lake pigment was washed on a filter until free of chlorides and then dried at 65° C.

EXAMPLE 2—PINK LAKE

|  | Grams |
|---|---|
| "Kadox" | 475.0 |
| Water | 2000.0 |
|  |  |
| Red dye* | 12.5 |
| Water | 950.0 |
| Acetic acid (glacial) | 1.9 |

*Red dye: 2,chlor-4,amino-1,toluene-5, sulphonic acid coupled to 2,3,hydroxy naphthoic acid.

In the above example the ingredients of the first portion were thoroughly mixed in a suitable container for ten minutes. The red dye of the second portion was mixed in the water and acetic acid of the second portion and added to the first portion with agitation. Six grams of calcium chloride were added to the mixture which was then boiled for 20 minutes. The resulting lake pigment was filtered, washed free of cloride and dried at 65° C.

EXAMPLE 3—BROWN LAKE

| | Grams |
|---|---|
| "Kadox" | 475 |
| Water | 2000 |
| Basic brown dye* | 53 |
| Water | 800 |
| Barium chloride | 190 |
| Water | 1710 |

*Basic brown dye: Made from either meta phenylene diamine or meta toluylene diamine. (See Color Index, edited by F. M. Rowe, 1st edition, January, 1924, page 81, #331.)

In the above example the ingredients of the first portion were thoroughly mixed in a suitable container. The dye was dissolved in the water of the second portion and combined with the pigment mixture of the first portion with agitation. The mixture was heated to 60° C. and added to the barium chloride solution of the third portion. The resulting lake pigment was washed on a filter until free of chlorides, and dried at 65° C.

EXAMPLE 4—PREPARATION OF FINGER NAIL ENAMEL

Solution 1

| | | Per cent |
|---|---|---|
| (A) | Cellulose nitrate (½ sec. viscosity) | 12.0 |
| | Ethyl alcohol (denatured) | 4.9 |
| | Dibutyl phthalate | 3.1 |
| (B) | Lake pigment of Example 2 | 10.0 |
| (C) | Ethyl alcohol (denatured) | 7.0 |
| | Ethyl acetate | 38.0 |
| | Butyl acetate | 25.0 |
| | | 100.0 |

Solution 1 was prepared as follows: The ingredients of (A) were kneaded together in a "Werner & Pfleiderer" kneading machine for approximately one hour until the cellulose nitrate was thoroughly colloided. The lake pigment of (B) was incorporated in the colloid by working the mixture on a two roller mill until the pigment was dispersed in the colloid. The pigmented colloid was then dissolved in the solvent mixture (C) with a conventional paddle mixer.

Solution 2

| | Per cent |
|---|---|
| Cellulose nitrate (½ sec. viscosity) | 16.1 |
| Ethyl alcohol (denatured) | 6.9 |
| Ethyl acetate | 75.0 |
| Dibutyl phthalate | 2.0 |
| | 100.0 |

The ingredients of Solution 2 were thoroughly blended in any ordinary paddle mixer.

The final enamel was prepared by combining 10 parts by weight of the pigmented Solution 1 and 90 parts by weight of the clear Solution 2 by mixing in a conventional paddle mixer.

In preparing Solution 1 of the above enamel composition, the dispersion of the lake pigment in the cellulose nitrate colloid may be satisfactorily carried out in a ball mill, buhrstone mill, roller mill, kneading machine or other suitable device.

In place of the lake pigment of Example 1, the lake pigments of Examples 2 and 3 or other lake pigments prepared with small particle size zinc oxide as the substratum and other suitable chemically precipitable dyes may be substituted direct or in varying proportions to produce different shades or tints and different degrees of opacity. In general, however, it is preferred for finger nail enamels to employ the lake pigment in the proportion of about 1 part of lake pigment to about 15 parts of cellulose nitrate and within the range of about 1 part of lake pigment to 5 parts of cellulose nitrate to 1 part of lake pigment to 30 parts of cellulose nitrate, although for other finishing purposes, the ratio of lake pigment may be increased considerably.

The viscosity characteristic of the cellulose nitrate used in the composition of this invention is about 3 seconds as determined in accordance with procedure outlined in A. S. T. M. specifications D–301–33, Formula B. While a cellulose nitrate of about this viscosity characteristic is preferred, cellulose nitrates of somewhat higher or even lower viscosities may be utilized by suitable adjustments in the ratios of the other film-forming ingredients.

The types and proportions of solvents utilized in the finger nail enamel composition of this invention may be varied over a considerable range and the substitution of an equivalent material or a change in proportions to suit conditions of application or other special requirements is considered within the ordinary practice of one skilled in the art. This also applies to the plasticizer ingredient of the composition. Resins, natural or synthetic, may also be included if desired.

This invention is not limited to the dyes or the amounts shown in the examples, and the same may be varied over rather wide limits depending on the particular shade of finger nail enamel desired. Generally the so-called acid dyes are most satisfactory. However, as illustrated in Example 3 basic dyes similar to basic brown are suitable.

The addition of other dyes or properly dispersed pigments is permissible when the color and/or opacity of the lake pigment enamel requires adjustment.

It has been found that the chemical precipitation of a dye on small particle size zinc oxide as the substratum provides an intimate and permanent association not present when these materials are admixed mechanically as generally practiced heretofore. The deposition and fixation of the dye by chemical precipitation in and around the small particles affords a product that is chemically and physically distinguished from compositions previously available which caused consumer complaints because of pigment settling, dye segregation and discoloration, defects which are eliminated in the new products.

In addition to finger nail enamel compositions, the lake pigments of the present invention are of utility in many types of cellulose ester coating compositions including industrial enamels, leather dopes, plastics, etc.

This improved finger nail enamel is characterized by extraordinary stability with respect to color, opacity and homogeneity, and as a result such defects as pigment settling, dye segregation, change of color and loss of opacity, inherent to the customary pigmented finger nail enamels, are practically eliminated.

It is apparent that many widely different embodiments of this invention may be made without departing from the spirit and scope thereof; and, therefore, it is not intended to be limited except as indicated in the appended claims.

I claim:

1. A non-settling and non-segregating opaque finger nail enamel composition comprising cellulose nitrate and a lake pigment consisting of zinc oxide having an average particle size between 0.12 and 0.18 micron and a dye chemically precipitated thereon.

2. Composition of claim 1 in which the dye is an acid dye.

3. A non-settling and non-segregating opaque finger nail enamel composition comprising cellulose nitrate and a lake pigment consisting of zinc oxide of particle size between 0.12 and 0.18 micron and a dye chemically precipitated thereon in the ratio of between 1 part of said lake pigment to 5 parts of cellulose nitrate and 1 part of said lake pigment to 30 parts of cellulose nitrate.

ROBERT T. HUCKS.